United States Patent
Kang et al.

(10) Patent No.: US 10,371,993 B2
(45) Date of Patent: Aug. 6, 2019

(54) CURVED LIQUID CRYSTAL DISPLAY

(71) Applicant: SAMSUNG DISPLAY CO., LTD., Yongin-si, Gyeonggi-do (KR)

(72) Inventors: Hyun-Ho Kang, Yongin-si (KR); O Sung Seo, Yongin-si (KR); Seung Jun Yu, Yongin-si (KR); Ha Won Yu, Yongin-si (KR); Ki Kyung Youk, Yongin-si (KR); Yeo Geon Yoon, Yongin-si (KR); Sang-Myoung Lee, Yongin-si (KR); Tae Kyung Yim, Yongin-si (KR)

(73) Assignee: Samsung Display Co., Ltd., Yongin-Si, Gyeonggi-do (KR)

( * ) Notice: Subject to any disclaimer, the term of this patent is extended or adjusted under 35 U.S.C. 154(b) by 0 days.

(21) Appl. No.: 15/498,195

(22) Filed: Apr. 26, 2017

(65) Prior Publication Data
US 2017/0227824 A1    Aug. 10, 2017

Related U.S. Application Data

(63) Continuation of application No. 14/968,956, filed on Dec. 15, 2015, now Pat. No. 9,645,452.

(30) Foreign Application Priority Data

Jan. 7, 2015    (KR) .................. 10-2015-0002075

(51) Int. Cl.
*G02F 1/1343*    (2006.01)
*G02F 1/1337*    (2006.01)
*G02F 1/1362*    (2006.01)

(52) U.S. Cl.
CPC .. *G02F 1/134309* (2013.01); *G02F 1/133707* (2013.01); *G02F 1/13624* (2013.01); *G02F 2001/133757* (2013.01); *G02F 2001/134345* (2013.01); *G02F 2201/123* (2013.01)

(58) Field of Classification Search
CPC .................. G02F 1/134309; G02F 1/133707
See application file for complete search history.

(56) References Cited

U.S. PATENT DOCUMENTS

| | | | |
|---|---|---|---|
| 9,147,371 B2 | 9/2015 | Chen et al. | |
| 2010/0245222 A1* | 9/2010 | Cho | G02F 1/133707 345/89 |
| 2011/0141423 A1 | 6/2011 | Cheng et al. | |

(Continued)

FOREIGN PATENT DOCUMENTS

| | | |
|---|---|---|
| JP | 2007-333818 A | 12/2007 |
| JP | 2009-150982 A | 7/2009 |
| JP | 2009-229667 A | 10/2009 |

*Primary Examiner* — James A Dudek
(74) *Attorney, Agent, or Firm* — Lee & Morse, P.C.

(57) ABSTRACT

A curved liquid crystal display includes a first panel having a pixel electrode including crossed stem parts, a plurality of fine branch parts extending from the crossed stem parts, and fine slits positioned between fine branch parts adjacent to each other, a second panel having a common electrode, and a liquid crystal layer between the first panel and the second panel. Misalignment between the first panel and the second lower panel is determined and a pitch, which is a sum of a width of the fine branch part and a width of the fine slit, gradually increases from a region having a small misalignment toward a region having a large misalignment.

14 Claims, 19 Drawing Sheets

(56) References Cited

U.S. PATENT DOCUMENTS

| | | | |
|---|---|---|---|
| 2013/0050629 A1* | 2/2013 | Kang | G02F 1/133707 349/144 |
| 2013/0321740 A1 | 12/2013 | An et al. | |
| 2014/0009719 A1* | 1/2014 | Xu | G02F 1/134309 349/61 |
| 2015/0055063 A1* | 2/2015 | Hsieh | G02F 1/133753 349/99 |
| 2016/0085093 A1 | 3/2016 | Lee et al. | |

* cited by examiner

CURVED LIQUID CRYSTAL DISPLAY

CROSS-REFERENCE TO RELATED APPLICATIONS

This is a continuation application based on pending application Ser. No. 14/968,956, filed Dec. 15, 2015, the entire contents of which is hereby incorporated by reference.

Korean Patent Application No. 10-2015-0002075, filed on Jan. 7, 2015, in the Korean Intellectual Property Office, and entitled: "Curved Liquid Crystal Display," is incorporated by reference herein in its entirety.

BACKGROUND

1. Field

Embodiments relate to a curved liquid crystal display.

2. Description of the Related Art

A liquid crystal display (LCD) is one of the most widely used flat panel displays and includes two sheets of display panels having electrodes thereon and a liquid crystal layer interposed therebetween. When a voltage is applied to the electrodes, an electric field is formed that rearranges liquid crystal molecules of the liquid crystal layer and control transmittance of light depending thereon, thereby displaying an image.

Recently, to meet a demand for a large-sized liquid crystal display and increase viewer's immersion experience, a curved the liquid crystal display has been developed. The curved liquid crystal display has been manufactured to have a constant curvature by applying an external force to a flat type liquid crystal panel.

In this case, when the liquid crystal panel is curved, misalignment of upper and lower panels may occur, and as a result, luminance may deteriorate and image quality may deteriorate.

SUMMARY

One or more embodiments are directed to a curved liquid crystal display, including a first panel having a pixel electrode including crossed stem parts, a plurality of fine branch parts extending from the crossed stem parts, and fine slits positioned between fine branch parts adjacent to each other, a second panel having a common electrode, and a liquid crystal layer between the first panel and the second panel, wherein at least first and second misalignment regions, due to misalignment between the first panel and the second panel, are identified. At least one of a pitch, which is a sum of a width of the fine branch part and a width of the fine slit, and the width of the fine slit gradually increases from the first misalignment region having a smaller misalignment toward a second region having a larger misalignment.

The width of the fine slit may gradually increase from the first misalignment region toward the second misalignment region.

The width of the fine branch part may gradually decrease from the first misalignment region toward the second misalignment region.

A ratio of the width of the fine slit to the width of the fine branch part may gradually increase from the first misalignment region toward the second misalignment region.

The pitch may be between 5 µm and 7 µm.

The pitch in the second first misalignment region may be 7 µm.

The width of the fine slit may be larger than that of the fine branch part.

The width of the fine slit may be equal to or more than 4 µm.

The first and second misalignment regions may be symmetrically distributed to a left and a right direction of a screen.

Misalignment may decrease from the center on the left and the right of the screen, respectively, toward a periphery.

The pixel electrode may include a first subpixel electrode and a second subpixel electrode, and when the same data voltage is applied to the first subpixel electrode and the second subpixel electrode, a first subpixel voltage of the first subpixel electrode and a second subpixel voltage of the second subpixel electrode are different from each other.

One or more embodiments are directed to a curved liquid crystal display, including a first insulating substrate, a gate line and a data line on the first insulating substrate, the gate line and the data line intersect each other and are insulated from each other, a thin film transistor connected to the gate line and the data line, pixel electrodes including crossed stem parts, a plurality of fine branch parts extending from the crossed stem parts, and fine slits positioned between fine branch parts adjacent to each other and positioned on the thin film transistors, a common electrode facing the pixel electrode; and a liquid crystal layer between the pixel electrode and the common electrode. At least one of a pitch, which is a sum of a width of the fine branch part and a width of the fine slit, and the width of the fine slit gradually decreases from centers on a left and a right of a screen, respectively, toward a periphery of the screen.

The width of the fine slit may gradually decrease from the centers on the left and right of the screen, respectively, toward the periphery of the screen.

The width of the fine branch part may gradually increase from the centers on the left and right of the screen, respectively, toward the periphery of the screen.

A ratio of the width of the fine slit to the width of the fine branch part may gradually increase from the centers on the left and the right of the screen, respectively, toward the outside.

The pitch may be between from 5 µm to 7 µm.

Pitches in middle regions on the left and the right of the screen, respectively, may be 7 µm.

The width of the fine slit may be larger than that of the fine branch part.

The width of the fine slit may be equal to or more than 4 µm.

The pixel electrode may include a first subpixel electrode and a second subpixel electrode, and when the same data voltage is applied to the first subpixel electrode and the second subpixel electrode, a first subpixel voltage of the first subpixel electrode and a second subpixel voltage of the second subpixel electrode are different from each other.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
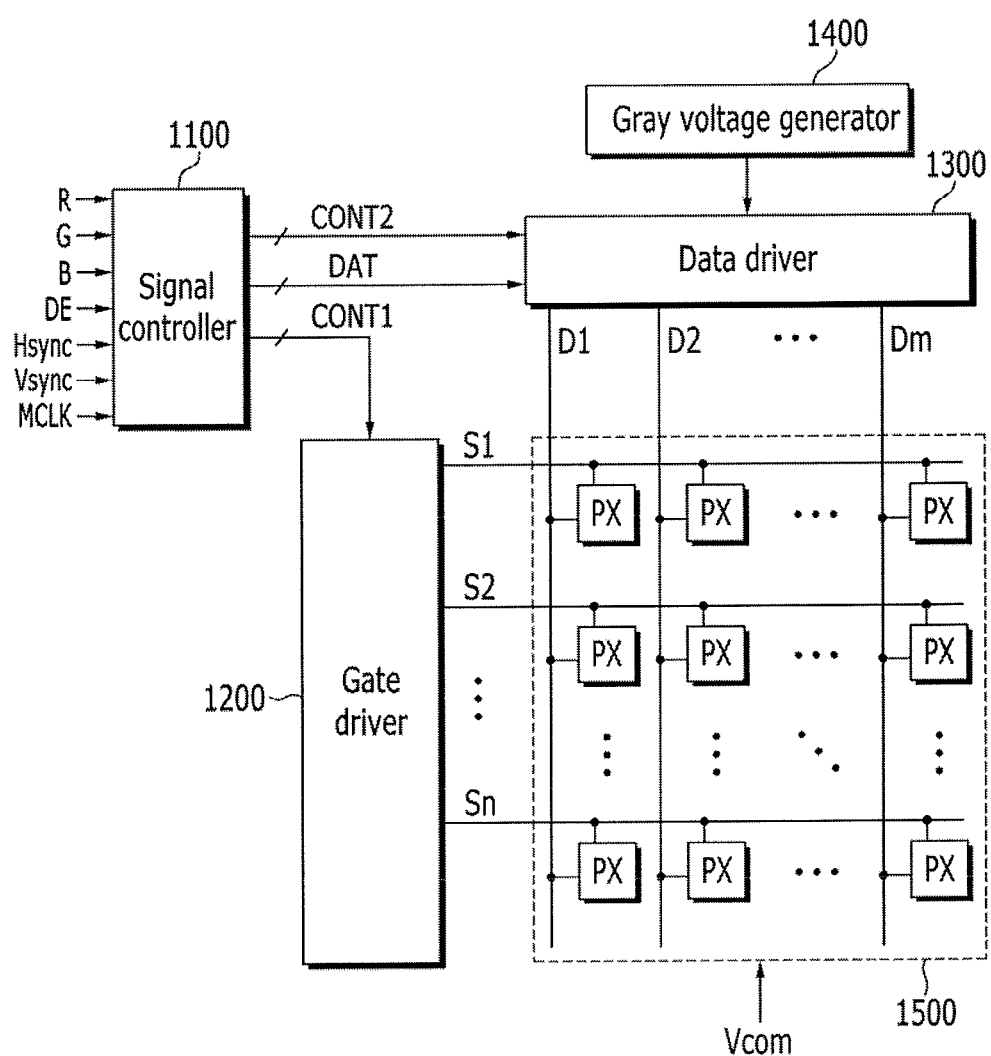
FIG. 1 illustrates a block diagram of a curved liquid crystal display according to an exemplary embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

Further, in exemplary embodiments, since like reference numerals designate like elements having the same configuration, a first exemplary embodiment is representatively described, and in other exemplary embodiments, only a configuration different from the first exemplary embodiment will be described Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a curved liquid crystal display according to exemplary embodiments will be described in detail with reference to the accompanying drawings.

FIG. 1 illustrates a block diagram of a curved liquid crystal display according to an exemplary embodiment. Referring to FIG. 1, the curved liquid crystal display includes a signal controller 1100, a gate driver 1200, a data driver 1300, a gray voltage generator 1400, and a liquid crystal panel assembly 1500.

The liquid crystal panel assembly 1500 includes a plurality of gate lines S1 to Sn, a plurality of data lines D1 to Dm, and a plurality of pixels PXs. The plurality of pixels PX are connected to the plurality of gate lines S1 to Sn and the plurality of data lines D1 to Dm, and are arranged in approximately a matrix form. The plurality of gate lines S1 to Sn extend in approximately a first direction, e.g., a row direction, and are substantially parallel with each other. The plurality of data lines D1 to Dm extend in approximately a second direction, e.g., a column direction orthogonal to the row direction, and are substantially parallel with each other. Herein, a case is illustrated in which only the plurality of gate lines S1 to Sn and the plurality of data lines D1 to Dm are connected to the plurality of pixels PXs, but the plurality of pixels PXs may be additionally connected to various signal lines, such as a power supply line and a voltage dividing reference voltage line, depending on a structure of a pixel PX, a driving method, or the like.

A back surface of the liquid crystal panel assembly 1500 may be provided with a backlight that controls luminance of an image displayed in the liquid crystal panel assembly 1500. The backlight emits light to the liquid crystal panel assembly 1500.

The signal controller 1100 receives image signals R, G, and B and an input control signal. The image signals R, G, and B contain luminance information on the plurality of pixels. The luminance has a predetermined value, e.g., 1024=210, 256=28 or 64=26 gray values. The input control signal includes a data enable signal DE, a horizontal synchronization signal Hsync, a vertical synchronization signal Vsync, and a main clock signal MCLK.

The signal controller 1100 generates a gate control signal CONT1, a data control signal CONT2, and an image data signal DAT depending the image signals R, G, and B, the data enable signal DE, the horizontal synchronizing signal Hsync, the vertical synchronization signal Vsync, and the main clock signal MCLK. The signal controller 1100 distinguishes the image signals R, G, and B in a frame unit depending on the vertical synchronization signal Vsync and distinguishes the image signals R, G, and B in a gate line unit depending on the horizontal synchronizing signal Hsync to generate the image data signal DAT.

The signal controller 1100 transfers the image data signal DAT and the data control signal CONT2 to the data driver 1300. The data control signal CONT2 controls operation of the data driver 1300 and includes a horizontal synchronization start signal STH that indicates a transmission start of the image data signal DAT, and a load signal LOAD and a data clock signal HCLK that instruct the plurality of data lines D1 to Dm to output data signals. The data control signal CONT2 may further include an inversion signal RVS that inverts a voltage polarity of the image data signal DAT for a common voltage Vcom.

The signal controller 1100 transfers the gate control signal CONT1 to the gate driver 1200. The gate control signal CONT1 includes a scanning start signal STV from the gate driver 1200 and at least one clock signal that controls an output of a gate-on voltage Von. The gate control signal CONT1 may further include an output enable signal OE which limits a duration of the gate-on voltage Von.

The data driver 1300 is connected to the data lines D1 to Dm of the liquid crystal panel assembly 1500 and selects a gray voltage from the gray voltage generator 1400. The data driver 1300 applies the selected gray voltage to the data lines D1 to Dm as a data signal. The gray voltage generator 1400 does not provide all the gray voltages and may provide only the defined number of reference gray voltages. In this case, the data driver 1300 divides the reference gray voltage to generate all the gray voltages and may select the data signal from the generated gray voltages.

The gate driver 1200 applies a gate signal, which is a combination of the gate-on voltage turning on switching elements (Qa, Qb, and Qc of FIG. 2) connected to the gate lines S1 to Sn of the liquid crystal panel assembly 1500 and a gate-off voltage turning off the switching elements, to the gate lines S1 to Sm.

The liquid crystal panel assembly 1500 is provided in a curved form. As the liquid crystal panel assembly 1500 is provided in the curved form, misalignment of the first and second panels having the liquid crystal therebetween occurs. When the misalignment of the first and second panels occurs, problems, e.g., deterioration in luminance, the occurrence of texture, and the like, may occur. The misalignment of the first and second panels may occur in a specific region which is defined in advance depending on a size, a curvature radius, or the like of the liquid crystal panel assembly 1500.

To solve the problem of the misalignment of the first and second panels, the liquid crystal display according to the exemplary embodiment strengthens a control power of the liquid crystal of the lower panel at a portion where the misalignment is large and weakens a control power of the liquid crystal of the lower panel at a portion where the misalignment is small. This will be described with reference to FIGS. 9 to 14.

The signal controller 110, the gate driver 1200, the data driver 1300, and the gray voltage generator 1400 which are described above each may be directly mounted on the liquid crystal panel assembly 1500 in at least one IC chip type, mounted on a flexible printed circuit film, attached to the liquid crystal panel assembly 1500 in a tape carrier package (TCP) type, or mounted on a separate printed circuit board (PCB). Alternatively, the signal controller 1100, the gate driver 1200, the data driver 1300, and the gray voltage generator 1400 may be integrated in the liquid crystal panel assembly 1500, along with the signal lines S1 to Sn and D1 to Dm.

Figure 2:
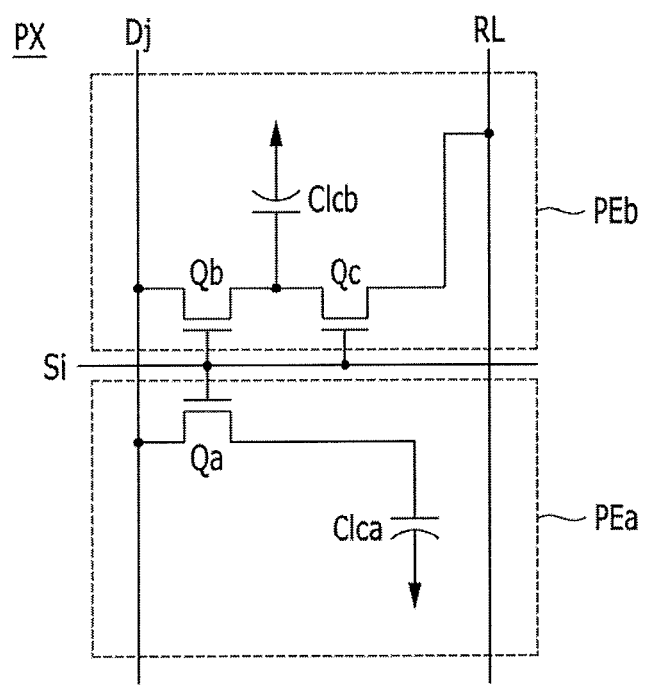
FIG. 2 illustrates a circuit diagram of one pixel of the curved liquid crystal display according to the exemplary embodiment.

FIG. 2 illustrates a circuit diagram of one pixel of the curved liquid crystal display according to the exemplary embodiment. Referring to FIG. 2, a circuit structure of the pixel of the curved liquid crystal display according to the exemplary embodiment and a driving method thereof will be described.

One pixel PX in the curved liquid crystal display may include the first to third switching elements Qa, Qb, and Qc and first and second liquid crystal capacitors Clca and Clcb.

The first and second switching elements Qa and Qb are each connected to a gate line Si and a data line Dj. The third switching element Qc is connected to the gate line Si, an output terminal of the second switching element Qb, and a voltage dividing reference voltage line RL. The first switching element Qa and the second switching element Qb are a three terminal element, e.g., a thin film transistor, and a control terminal thereof is connected to the gate line Si and an input terminal thereof is connected to a data line Dj. The output terminal of the first switching element Qa is connected to the first liquid crystal capacitor Clca. The output terminal of the second switching element Qb is connected to the second liquid crystal capacitor Clcb and an input terminal of the third switching element Qc. The third switching element Qc is also the three-terminal element, such as the thin film transistor, and a control terminal thereof is connected to the gate line Si, an input terminal thereof is connected to the second liquid crystal capacitor Clcb, and an output terminal thereof is connected to the voltage dividing reference voltage line RL.

When a gate on signal is applied to the gate line Si, the first, second, and third switching elements Qa, Qb, and Qc connected to the gate line Si are turned on. In this case, the data signal is applied to the data line Dj and the data signal applied to the data line Dj is applied to a first subpixel electrode PEa through the first switching element Qa which is turned on and is applied to a second subpixel electrode PEb through the second switching element Qb which is turned on. The data signals applied to the first subpixel electrode PEa and the second subpixel electrode PEb are the same. Ttherefore, the first liquid crystal capacitor Clca and the second liquid crystal capacitor Clcb are charged with the same value which corresponds to a difference between a common voltage and a data voltage, but simultaneously therewith, the voltage charged in the second liquid crystal capacitor Clcb is divided by the third switching element Qc which is turned on. As a result, the voltage charged in the second liquid crystal capacitor Clcb is lowered by a difference between the common voltage and the voltage dividing reference voltage. That is, the first subpixel voltage which is charged in the first liquid crystal capacitor Clca and the second subpixel voltage which is charged in the second liquid crystal capacitor Clcb are different from each other.

Since the voltage charged in the first liquid crystal capacitor Clca and the voltage charged in the second liquid crystal capacitor Clcb are different from each other, inclined angles of liquid crystal molecules in the first subpixel and the second subpixel are different from each other, and thus the luminance of the two subpixels is different from each other. Therefore, when the voltage of the first liquid crystal capacitor Clca and the voltage of the second liquid crystal capacitor Clcb are appropriately controlled, an image viewed from a side may maximally appear like an image viewed from a front, i.e., side visibility may be improved.

Herein, the circuit of the pixel as illustrated in FIG. 2 is described, but the pixel of the curved liquid crystal display according to the exemplary embodiments are not limited thereto, but may be variously configured.

Hereinafter, the structure of the liquid crystal panel assembly 1500 of the curved liquid crystal display according to the exemplary embodiment will be described with reference to FIGS. 3 and 4.

Figure 3:
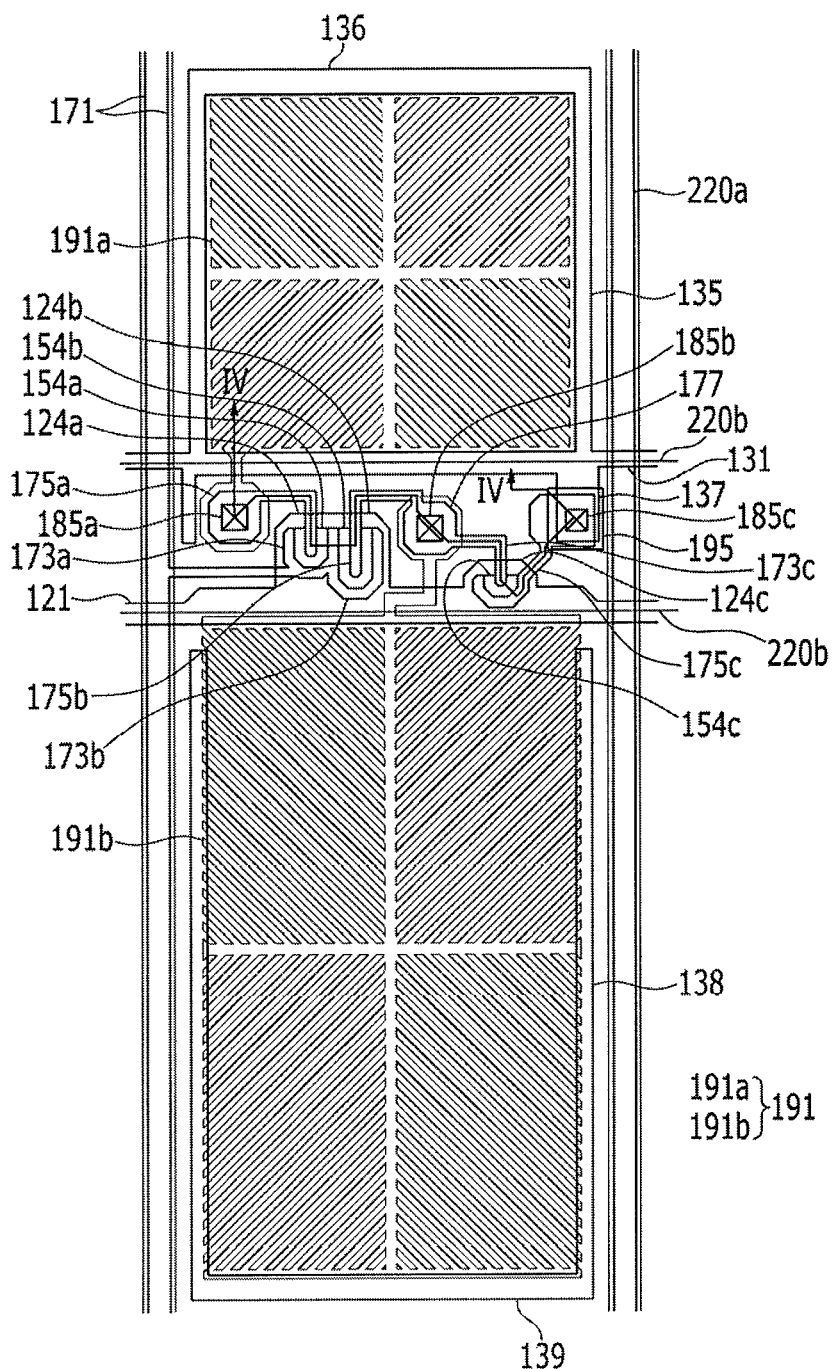
FIG. 3 illustrates a plan view of one pixel of the curved liquid crystal display according to the exemplary embodiment.

FIG. 3 illustrates a plan view of one pixel of the curved liquid crystal display according to the exemplary embodiment. FIG. 4 is a cross-sectional view taken along the line IV-IV of FIG. 3.

Figure 4:
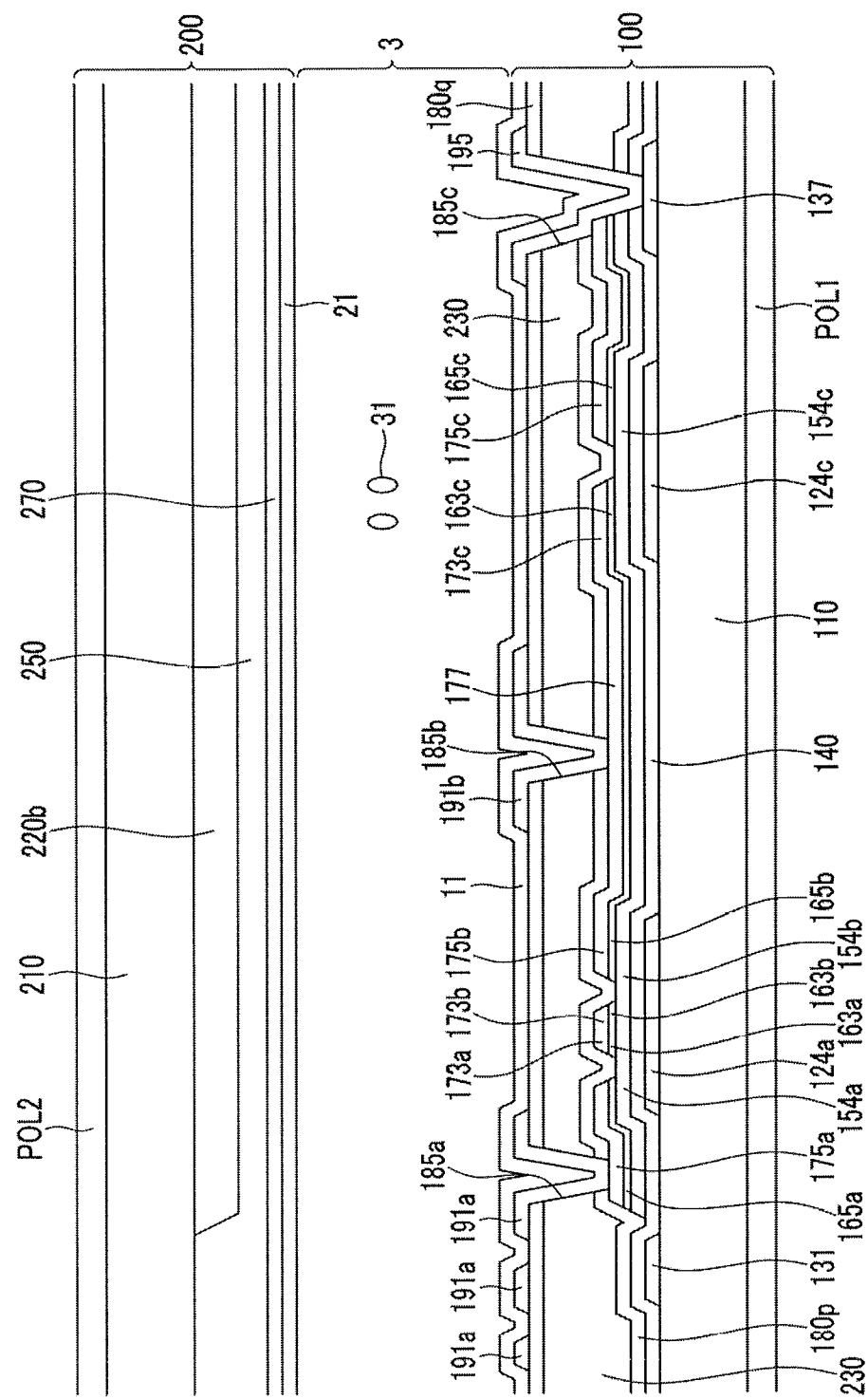
FIG. 4 illustrates a cross-sectional view taken along the line IV-IV of FIG. 3.

Referring to FIGS. 3 and 4, the curved liquid crystal display includes a first panel 100, here a lower panel, and a second panel 200, here an upper panel, which face each other, and a liquid crystal layer 3 which includes liquid crystal molecules 31 interposed between the two display panels 100 and 200. A pair of polarizers POL1 and POL2 may be attached to outer surfaces of the two display panels 100 and 200.

First, the first panel 100 will be described.

A gate conductor including a gate line 121 and a voltage dividing reference voltage line 131 is on a first insulating substrate 110. The gate line 121 includes a wide end to be connected to a first gate electrode 124a, a second gate electrode 124b, a third gate electrode 124c, and other layers or external driving circuits. The voltage division reference voltage line 131 includes first sustain electrodes 135 and 136, and a reference electrode 137. Second sustain electrodes 138 and 139 are not connected to the voltage dividing reference voltage line 131, but overlap a second subpixel electrode 191b.

The gate insulating layer 140 is on the gate line 121 and the voltage dividing reference voltage line 131, and a first semiconductor layer 154a, a second semiconductor layer 154b, and a third semiconductor layer 154c are on the gate insulating layer 140. A plurality of ohmic contacts 163a, 165a, 163b, 165b, 163c, and 165c may be on the semiconductor layers 154a, 154b, and 154c.

A plurality of data lines 171, including a first source electrode 173a and a second source electrode 173b, and a data conductor, including a first drain electrode 175a, a second drain electrode 175b, a third source electrode 173b, and a third drain electrode 175c, are on the ohmic contacts 163a, 165a, 163b, 165b, 163c, and 165c and the gate insulating layer 140. The data conductor, the semiconductor layers therebeneath, and the ohmic contact may be simultaneously formed using a single mask. The data line 171 may include a wide tip portion for connecting with other layers or external driving circuits and may include the semiconductor layers 154a, 154b, and 154c which have the same plane form and the ohmic contact 163a, 165a, 163b, 165b, 163c, and 165c.

The first gate electrode 124a, the first source electrode 173a, and the first drain electrode 175a, along with the first semiconductor layer 154a, form the single first thin film transistor Qa. A channel of the first thin film transistor Qa is on the first semiconductor layer 154a between the first source electrode 173a and the first drain electrode 175a.

Similarly, the second gate electrode 124b, the second source electrode 173b, and the second drain electrode 175b, along with the second semiconductor layer 154b, form the single second thin film transistor Qb. The channel of the second thin film transistor Qb is on the second semiconductor layer 154b between the second source electrode 173b and the second drain electrode 175b.

The third gate electrode 124c, the third source electrode 173c, and the third drain electrode 175c, along with the third semiconductor layer 154c, form the single third thin film transistor Qc. The channel of the third thin film transistor Qc is on the third semiconductor layer 154c between the third source electrode 173c and the third drain electrode 175c. The second drain electrode 175b is connected to the third source electrode 173c and includes a wide expansion 177.

A first passivation layer 180p may be on the data conductors 171, 173c, 175a, 175b, and 175c, and the exposed semiconductor layers 154a, 154b, and 154c. The first passivation layer 180p may be an inorganic insulating layer made of silicon nitride, silicon oxide, or the like. The first passivation layer 180p may prevent a pigment of a color filter 230 from flowing in the exposed semiconductor layers 154a, 154b, and 154c.

A vertical light blocking member 220a and a color filter 230 may be on the first passivation layer 180p. Any one of the vertical light blocking member 220a and the color filter 230 may be first provided or formed. The vertical light blocking member 220a may have the same or similar plane shape as or to the data line 171 and may cover the data line 171.

Herein, the light blocking member 220a extends in a vertical direction, but the exemplary embodiments are not limited thereto, and the light blocking member 220 may be simultaneously formed with the pixel electrode, and a shielding electrode to receive the common voltage may also be formed.

The color filter 230 extends in a vertical direction along two data lines which are adjacent to each other. The two color filters 230 adjacent to each other are spaced apart from each other based on the data line 171 and may overlap each other in an adjacent region to the data line 171.

The color filter 230 may uniquely display one of the primary colors, e.g., three primary colors, such as red, green, and blue, or yellow, cyan, magenta, and the like. Although not illustrated, the color filter 230 may further include a color filter which displays a mixed color of the primary colors or white, in addition to the primary colors.

A second passivation layer 180q may be on the vertical light blocking member 220a and the color filter 230. The second passivation layer 180q may be an inorganic insulating layer made of silicon nitride, silicon oxide, or the like. The second passivation layer 180q prevents the color filter 230 from lifting and suppresses the pollution of the liquid crystal layer 3 due to organic materials, e.g., a solvent flowing from the color filter 230, thereby preventing defects, such as an afterimage, from occurring.

A first contact hole 185a exposing the first drain electrode 175a and a second contact hole 185b exposing the second drain electrode 175b, extend through the first passivation layer 180p, the color filter 230, and the second passivation layer 180q. A third contact hole 185c, exposing some of the reference electrode 137 and some of the third drain electrode 175c, extends through the first passivation layer 180p, the second passivation layer 180q, and the gate insulating layer 140. The third contact hole 185c is covered with a connecting member 195. The connecting member 195 electrically connects the reference electrode 137 and the third drain electrode 175c exposed through the third contact hole 185c.

A plurality of pixel electrodes 191 may be on the second passivation layer 180q. The pixel electrodes 191 are separated from each other, having the gate line 121 disposed therebetween, and each include the first subpixel electrode 191a and the second subpixel electrode 191b to each other in the second direction based on the gate line 121. The pixel electrode 191 may be made of transparent conductive materials, such as ITO and IZO, and/or may be made of reflective metals, such as aluminum, silver, chromium, or an alloy thereof.

Figure 9:
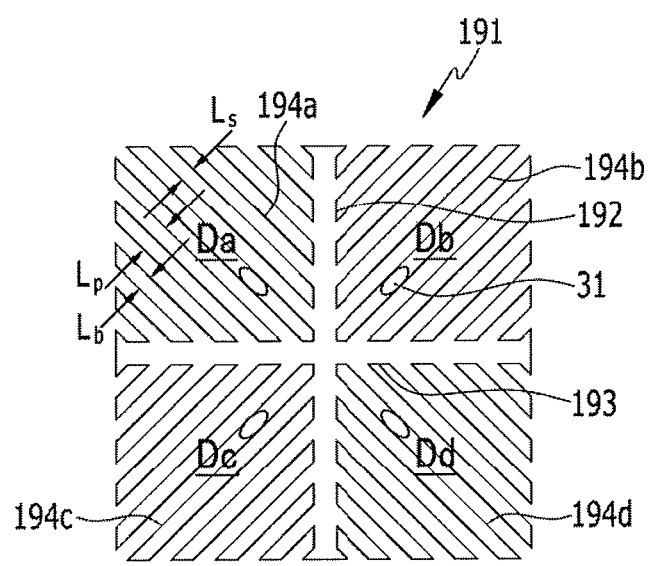
FIG. 9 illustrates a plan view of a basic electrode of a pixel electrode according to an exemplary embodiment.

The first subpixel electrode 191a and the second subpixel electrode 191b each include a basic electrode 199 illustrated in FIG. 9 or at least one modification thereof. A basic electrode of the pixel electrode 191 will be described below with reference to FIG. 9.

The first subpixel electrode 191a is physically and electrically connected to the first drain electrode 175a through the first contact hole 185a, and receives a data signal from the first drain electrode 175a. The second subpixel electrode 191b is physically and electrically connected to the second drain electrode 175b through the second contact hole 185b, and receives a data signal from the second drain electrode 175b. Some of the data signals applied to the second drain electrode 175b may be divided by the third source electrode 173c, such that a magnitude of the voltage applied to the first subpixel electrode 191a may be larger than that of the voltage applied to the second subpixel electrode 191b.

The first subpixel electrode 191a and the second subpixel electrode 191b receiving the data signal generate an electric field, along with a common electrode 270 of the upper display panel 200 to be described below, thereby determining an alignment of liquid crystal molecules of the liquid crystal layer 3 between the two electrodes 191 and 270. The luminance of light passing through the liquid crystal layer 3 along the alignment of the liquid crystal molecules determined as described above is changed.

A lower alignment layer 11 may be on the pixel electrode 191.

Hereinafter, the second panel 200 will be described.

A horizontal light blocking member 220b may be on a second insulating substrate 210. The horizontal light blocking member 220b is called a black matrix BM and prevents light from leaking out of the display. The horizontal light blocking member 220b may be in a region corresponding to the gate line 121. That is, the horizontal light blocking member 220b which extends in the first direction may be provided.

An overcoat 250 may be on the light blocking member. The overcoat 250 may be made of an organic insulating material and provides a flat surface. According to the exemplary embodiment, the overcoat 250 may be omitted.

A common electrode 270 may be on the overcoat 250. The common electrode 270 may be made of transparent conductors, such as ITO and IZO.

The upper alignment layer 21 may be on the common electrode 270.

The liquid crystal layer 3 includes the plurality of liquid crystal molecules 31 that are aligned to be vertical to the surfaces of the two substrates 110 and 210 when a voltage is not applied to the two field generating electrodes 191 and 270. The liquid crystal molecules 31 may be aligned to have a pretilt inclined in the same direction as a length direction of a cut pattern of the pixel electrode 191.

Hereinafter, a configuration to suppress the misalignment occurring in the curved liquid crystal panel assembly 1500 in the curved liquid crystal display and the deterioration in luminance, the occurrence of texture, and the like due to the misalignment will be described.

Figure 5A:
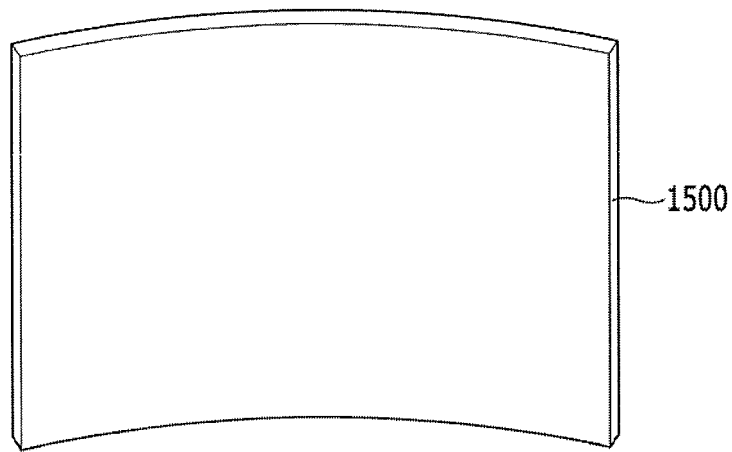
FIGS. 5A and 5B illustrate a schematic diagram of a curved liquid crystal panel assembly in the curved liquid crystal display according to exemplary embodiments.
Figure 5B:
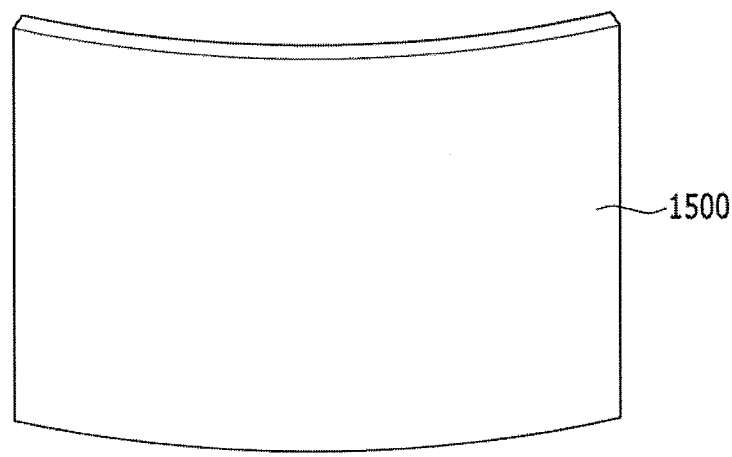

FIGS. 5A and 5B illustrate a diagram schematically of a curved liquid crystal panel assembly in the curved liquid crystal display according to the exemplary embodiment.

The liquid crystal panel assembly 1500 in the curved liquid crystal display may be concave, as illustrated in FIG. 5A or convex, as illustrated in FIG. 5B. When concave, a central portion of the liquid crystal panel assembly 1500 is retreated further backward than both edges relative to a viewing surface. When convex, the central portion of the liquid crystal panel assembly 1500 protrudes further forward than both edges relative to the viewing surface.

The concave or convex liquid crystal panel assembly 1500 may have a constant curvature or the central portion and both edge portions of the liquid crystal panel assembly 1500 may have multiple curvatures different from each other.

Hereinafter, for discussion and explanation, it is assumed that the liquid crystal panel assembly 1500 is concave. Hereinafter, the misalignment of the first and second panels will be described with reference to FIGS. 6 to 8.

Figure 6:
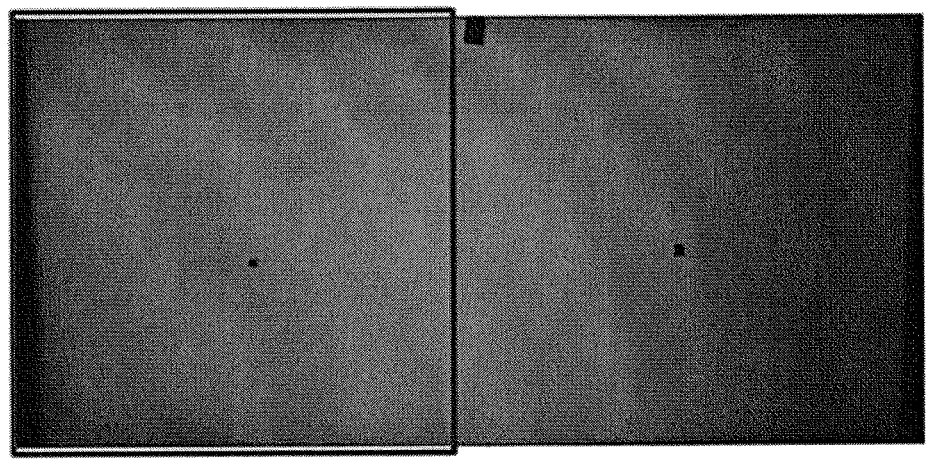
FIG. 6 illustrates a diagram of a curved liquid crystal display of a 55-inch UHD for measuring misalignment.
Figure 7:
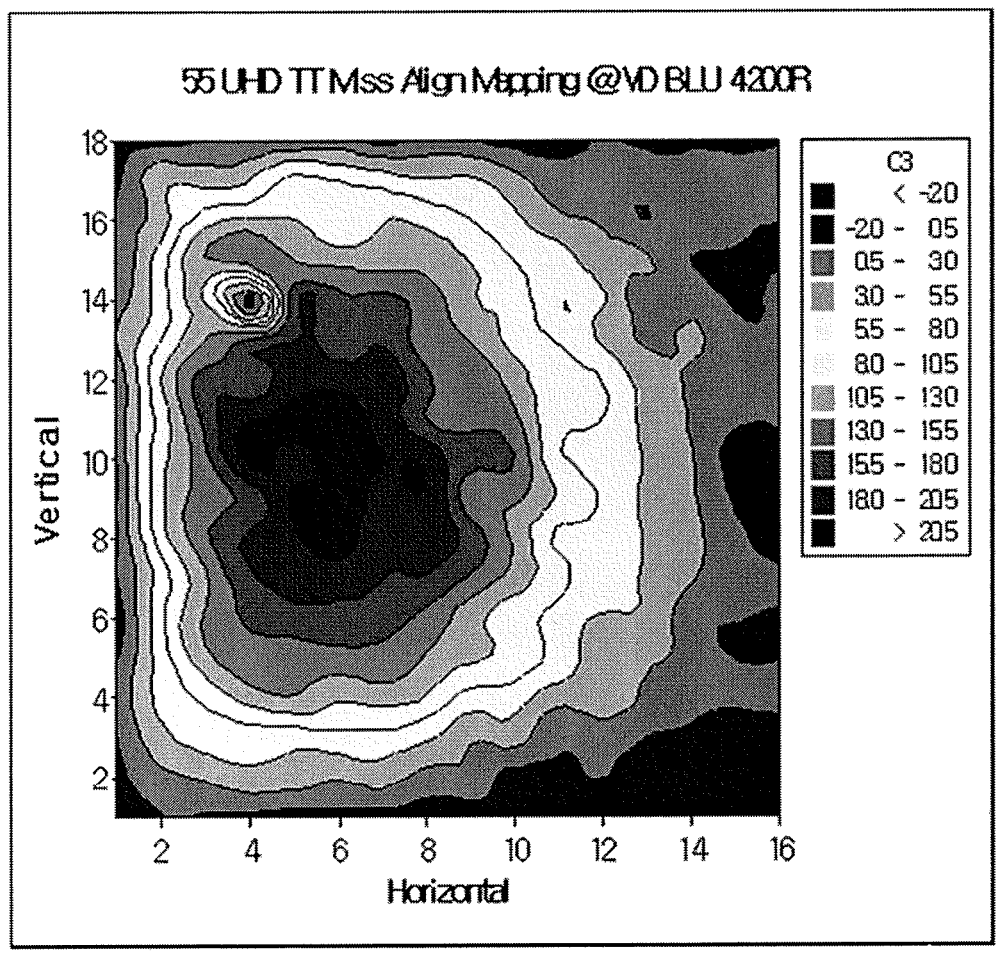
FIG. 7 illustrates a graph of a measurement result of the misalignment in FIG. 6.
Figure 8:
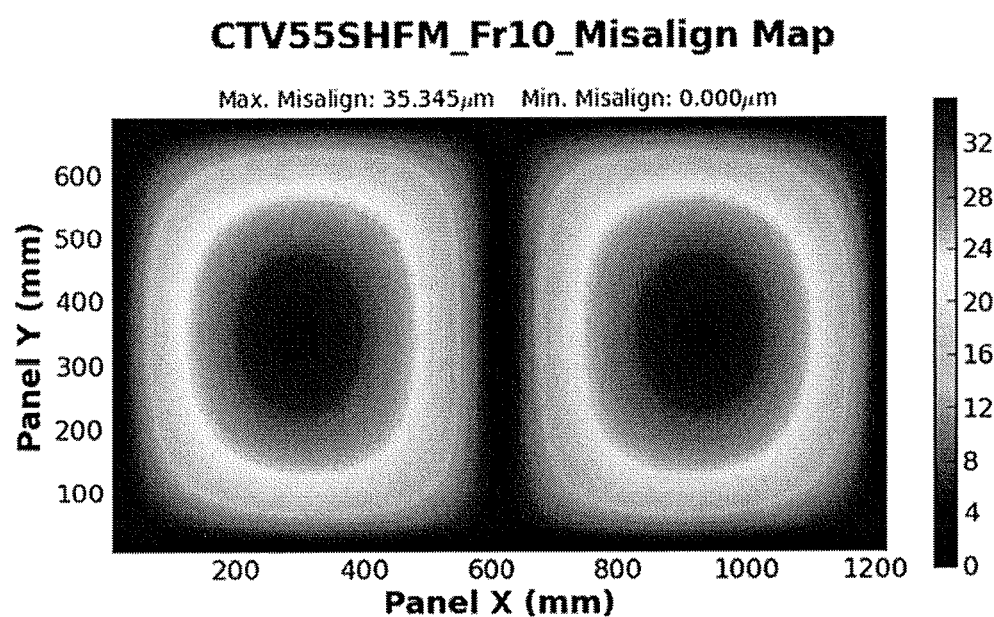
FIG. 8 illustrates a graph illustrating a computer aided engineering (CAE) analysis result of the misalignment of FIG. 7.

FIG. 6 illustrates a diagram of a curved liquid crystal display of a 55-inch UHD for measuring misalignment. FIG. 7 is a graph illustrating a measurement result of the misalignment in FIG. 6. FIG. 8 illustrates a graph of a computer aided engineering (CAE) analysis result of the misalignment.

As illustrated in FIGS. 6 and 7, the misalignment of the first and second panels is measured in a plurality of regions, e.g., 288 regions, of a left portion of the panel of the curved liquid crystal display of a 55-inch UHD. It can be seen that the misalignment at the left of the panel of the curved liquid crystal display is maximally represented at a point slightly biased to the left and is reduced toward the outside and central side of the panel.

The misalignment of the first and second panels may be analyzed by the computer aided engineering (CAE) technique, results of which are illustrated in FIG. 8. It is apparent from FIG. 8 that the misalignment region of the curved liquid crystal display may be substantially symmetrically distributed to a left and a right of a screen. The misalignment is reduced from centers of the left and the right of the screen toward a periphery thereof.

Hereinafter, a configuration to suppress the deterioration in luminance and the occurrence of texture due to the misalignment of the first and second panels in the curved liquid crystal display will be described with reference to FIGS. 9 to 14.

Figure 10:
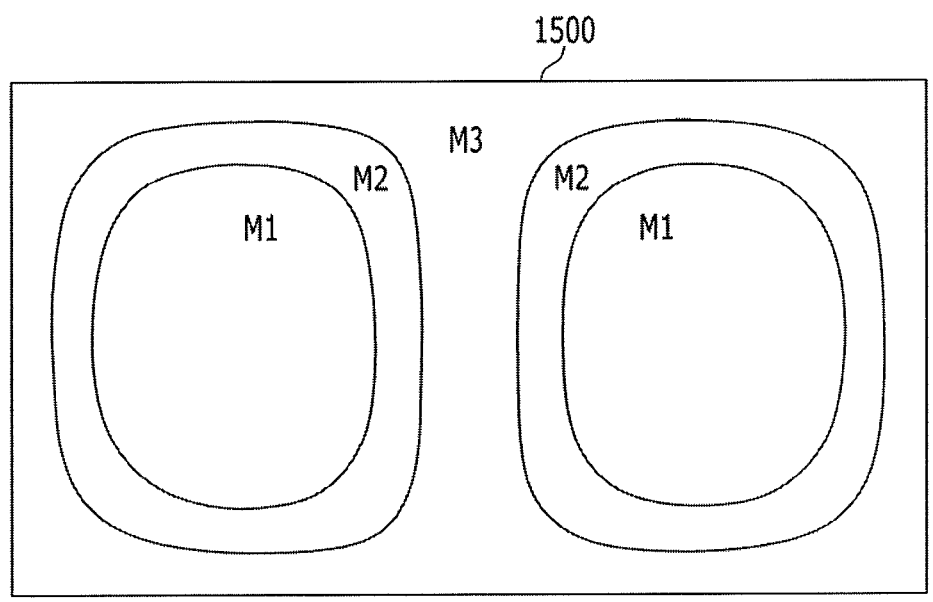
FIG. 10 illustrates a diagram of a disposition region of a pixel in the curved liquid crystal display according to the exemplary embodiment.
Figure 11A:
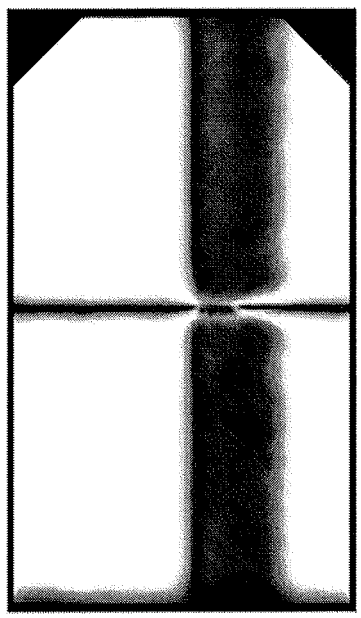
FIGS. 11A and 11B illustrate diagrams of a pixel having a pitch of 5 μm.
Figure 11B:
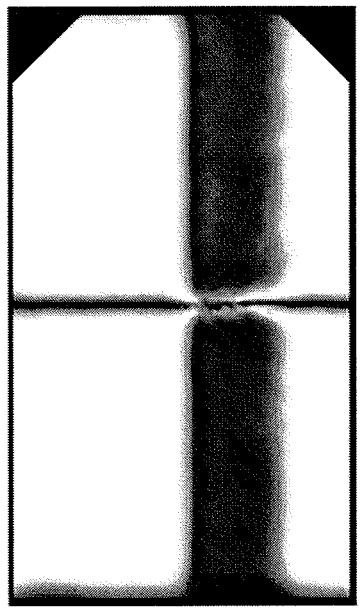
Figure 12A:
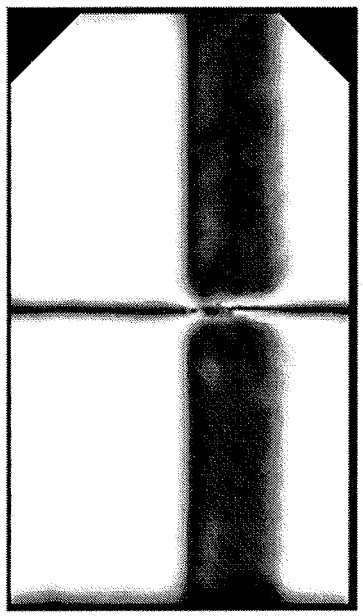
FIGS. 12A to 12C illustrate diagrams of a pixel having a pitch of 6 μm.
Figure 12B:
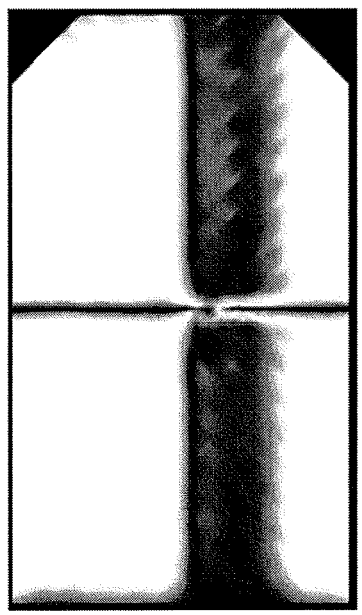
Figure 12C:
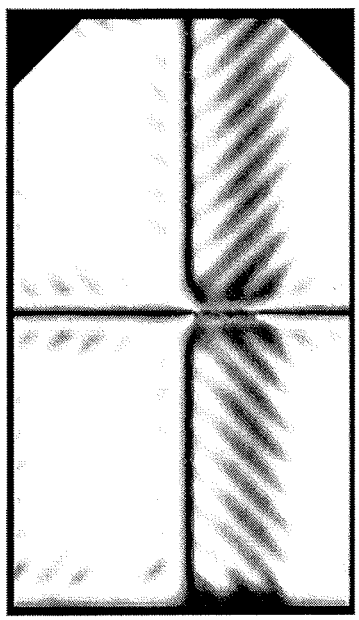
Figure 13A:
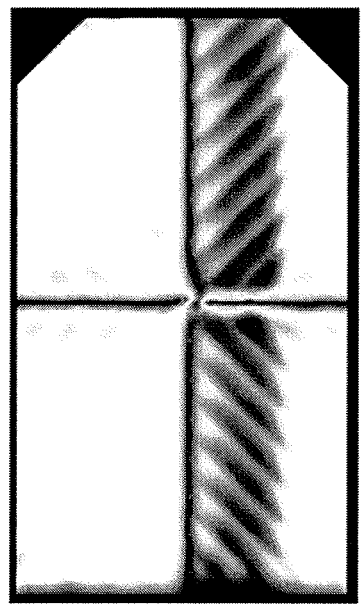
FIGS. 13A and 13B illustrate diagrams of a pixel having a pitch of 7 μm.
Figure 13B:
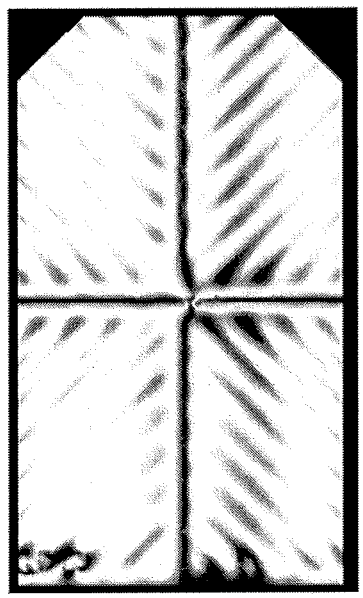
Figure 14A:
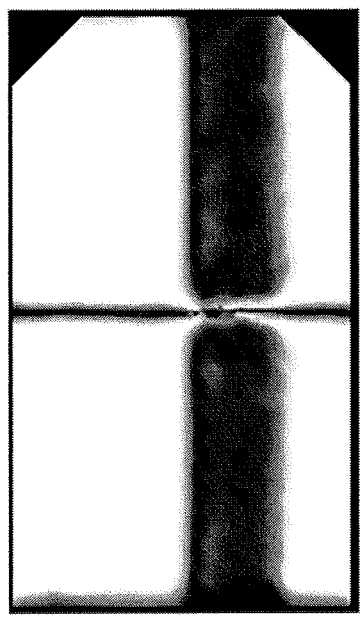
FIGS. 14A and 14B illustrate diagrams of a pixel in which widths of a branch electrode and a slit are different, in the pixel having a pitch of 6 μm.
Figure 14B:
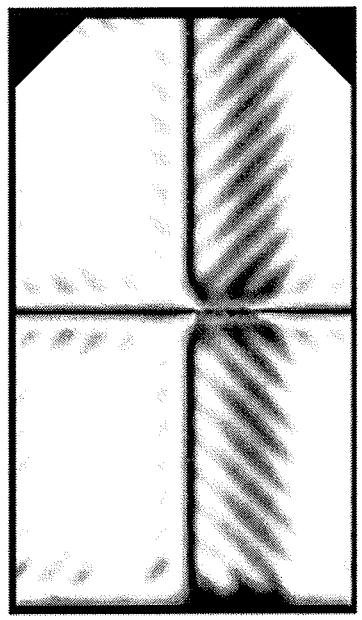

FIG. 9 illustrates a plan view of a basic electrode of a pixel electrode according to an exemplary embodiment. FIG. 10 illustrates a diagram of a disposition region of a pixel in the curved liquid crystal display according to the exemplary embodiment. FIGS. 11A and 11B illustrate diagrams of a pixel in the curved liquid crystal panel assembly having a pitch of 5 μm. FIGS. 12A to 12C illustrate diagrams of a pixel in the curved liquid crystal panel assembly having a pitch of 6 μm. FIGS. 13A and 13B illustrate diagrams of a pixel having a pitch of 7 μm. FIGS. 14A and 14B illustrate diagrams of a pixel in which widths of a branch electrode and a slit are different and having a pitch of 6 μm.

Referring to FIG. 9, the overall shape of the basic electrode may be a quadrangle and the basic electrode includes a crossed stem part include a first stem part 192 and a second stem part 193 orthogonal thereto. Here, the first stem part 192 may extend in a first direction, e.g., a vertical direction, and the second stem part 193 may extend in a second direction, e.g., a horizontal direction. Further, the basic electrode is divided into a first subregion Da, a second subregion Db, a third subregion Dc, and a fourth subregion Dd by the first stem part 192 and the second stem part 193. Each of the first to fifth subregions Da to Dd may include a plurality of first fine branch parts 194a, a plurality of second fine branch parts 194b, a plurality of third fine branch parts 194c, and a plurality of fourth fine branch parts 194d.

A fine slit having a width Ls is between the fine branch parts 194a, 194b, 194c, and 194d adjacent to each other in the quadrangular shape of the basic electrode. The fine slit is a region in which a conductor forming the crossed stem part and the fine branch part is not present.

The first fine branch part 194a obliquely extends left upwards from the first stem part 192 or the second stem part 193. The second fine branch part 194b obliquely extends right upwards from the first stem part 192 or the second stem part 193. The third fine branch part 194c extends left downwards from the first stem part 192 or the second stem part 193. The fourth fine branch part 194d obliquely extends right downwards from the first stem part 192 or the second stem part 193.

The first to fourth fine branch parts 194a, 194b, 194c, and 194d form an angle of approximately 45° or 135° with respect to the gate line 121a or 121b or the second stem part 193. Further, the fine branch parts 194a, 194b, 194c, and 194d of the two neighboring subregions Da, Db, Dc, and Db may be orthogonal to each other.

The first subpixel electrode 191a and the second subpixel electrode 191b are connected to the first drain electrode 175a or the second drain electrode 175b, respectively, through the first and second contact holes 185a and 185b, and receive a data voltage from the first drain electrode 175a and the second drain electrode 175b. In this case, sides of the first to fourth fine branch parts 194a, 194b, 194c, and 194d distort an electric field to generate a horizontal component which determines an inclined direction of the liquid crystal molecules 31. The horizontal component of the electric field is substantially horizontal to the sides of the first to fourth fine branch parts 194a, 194b, 194c, and 194d. Therefore, as illustrated in FIG. 4, the liquid crystal molecules 31 are inclined in a direction parallel with a length direction of the fine branch parts 194a, 194b, 194c, and 194d. The one pixel electrode 191 includes the four subpixel regions Da, Db, Dc, and Dd in which the length directions of the fine branch parts 194a, 194b, 194c, and 194d are different from each other. Therefore, directions in which the liquid crystal molecules 31 are inclined are approximately four directions and the liquid crystal layer 3 has four domains in which the alignment directions of the liquid crystal molecules 31 are different. As such, when the direction in which the liquid crystal molecules are inclined is various, a reference viewing angle of the liquid crystal display is increased.

One of the fine branch parts 194a, 194b, 194c, and 194d has a width of Lb. A sum of the width Lb of the one fine branch part and the width Ls of the one fine slit is referred to as a pitch Lp, i.e., Lp=Lb+Ls.

To suppress the deterioration in luminance and the occurrence of texture due to the misalignment of the first and second panels in the curved liquid crystal display, the control power of the liquid crystal of the first panel 100 is strengthened where misalignment is large and is weakened where misalignment is small. The control power of the liquid crystal of the lower panel 100 may be adjusted depending on the pitch Lp of the pixel electrode, the width Lb of the fine branch part, and the width Ls of the fine slit.

For example, to suppress the deterioration in luminance and the occurrence of texture due to the misalignment of the upper and lower panels in the curved liquid crystal display, the pixels may be configured so that (1) the pitch Lp gradually increases from the region in which the misalignment is small toward the region in which the misalignment is large, (2) the width Ls of the fine slit gradually increases and the width Lb of the fine branch part gradually decreases from the region in which the misalignment is small toward the region in which the misalignment is large, while the pitch is constant, (3) a ratio of the width Ls of the fine slit to the width Lb of the fine branch part gradually increases from the region in which the misalignment is small toward the region in which the misalignment is large, or (4) the pitch Lp gradually increases and the width Ls of the fine slit gradually increases and the width Lb of the fine branch part gradually decreases or remains constant from the region in which the misalignment is small toward the region in which the misalignment is large.

For example, as illustrated in FIG. 10, the misalignment region of the upper and lower panels in the liquid crystal panel assembly 1500 may be divided into three regions of M1, M2, and M3. The misalignment region may be symmetrically distributed to the left and the right of the screen, e.g., a center of the screen and a periphery of the screen may have a small misalignment, while centers of respective right and left portions of the screen may have a large misalignment that decrease towards the periphery of the screen. The misalignment is reduced from the centers on the left and the right of the screen toward the outside thereof. A M1 region of the center on the left and the right is a region having a large misalignment, a M2 region of an outside of the M1 region is a region having a medium misalignment, and a M3 region of an outside of the M2 region is a region having a small misalignment.

In this case, pixels may be configured so that the pitch Lp of a pixel in the M1 region is largest, the pitch Lp of a pixel in the M3 region is smallest, and the pitch Lp in the M2 region is medium, i.e., in between the largest and smallest. For example, the pitch Lp of the pixel in the M1 region may be 7 μm, the pitch Lp of the pixel in the M2 region may be 6 μm, and the pitch Lp of the pixel in the M3 region may be 5 μm. The larger the pitch Lp of the pixel, the larger the width Ls of the fine slit. When the pitch Lp is 7 μm, the width Ls of the fine slit may be equal to or more than approximately 4 μm and the width Lb of the fine branch part may be equal to or less than approximately 3 μm. When the pitch Lp is 6 μm, the width Ls of the fine slit may be equal to or more than approximately 3.5 μm and the width Lb of the fine branch part may be equal to or less than approximately 2.5 μm. When the pitch Lp is 5 μm, the width Ls of the fine slit may be equal to or more than approximately 3 μm and the width Lb of the fine branch part may be equal to or less than approximately 2 μm. As such, when the width Ls of the fine slit increases, an impact of a fringe field increases, thus improving the control power of the liquid crystal of the first panel.

Alternatively, when the pitches Lp of the pixels in the different regions are equal, the pixels may be configured so that the width Ls of the fine slit of the pixel in the M1 region is largest, the width Ls of the fine slit of the pixel in the M3 region is smallest, and the width Ls of the fine slit of the pixel in the M2 region is medium. This means that the width Lb of the fine branch part of the pixel in the M1 region is smallest, the width Lb of the fine branch part of the pixel in the M3 region is largest, and the width Lb of the fine branch part of the pixel in the M2 region is in the middle. For example, when the pitch Lp of the pixel is 6 μm, the width Lb of the fine branch part and the width Ls of the fine slit of the pixel in the M1 region each are 2 μm and 4 μm, the width Lb of the fine branch part and the width Ls of the fine slit of the pixel in the M2 region each are 3 μm and 3 μm, and the width Lb of the fine branch part and the width Ls of the fine slit of the pixel which is disposed in the M3 region each are 3.6 μm and 2.4 μm Alternatively, the pixels may be configured so that the width Ls of the fine slit of the pixel in the M1 region is largest, the width Ls of the fine slit of the pixel in the M3 region is smallest, and the width Ls of the fine slit of the pixel in the M2 region is medium while the pitch Lp of the pixel in the M1 region is largest, the pitch Lp of the pixel in the M3 region is smallest, and the pitch Lp of the pixel in the M2 region is medium. For example, the pitch Lp and the width Ls of the fine slit of the pixel in the M1 region each are 7 μm and 5 μm, the pitch Lp and the width Ls of the fine slit of the pixel in the M2 region each are 6 μm and 4 μm, and the pitch Lp and the width Ls of the fine slit of the pixel in the M3 region each are 5 μm and 3 μm.

As such, as the misalignment region is increased, the control power of the liquid crystal of the lower panel is improved and thus the luminance may be improved, such that the deterioration in luminance and the occurrence of texture due to the misalignment may be suppressed.

FIG. 10 illustrates a case in which the screen is divided into three misalignment regions, but embodiments are not limited thereto, e.g., the screen may be divided into two or more than three misalignment regions. Pixels in the different misalignment regions are configured according to any one of the foregoing (1) to (4). Thus, deterioration in luminance and the occurrence of texture due to the misalignment of the first and second panels may be suppressed.

FIG. 11A illustrates a pixel in which the width Lb of the fine branch part and the width Ls of the fine slit each are 2.5 µm and 2.5 µm. FIG. 11B illustrates a pixel in which the width Lb of the fine branch part and the width Ls of the fine slit each are 2 µm and 3 µm. When pixels having the pitch Lp of 5 µm is in a large misalignment region, as illustrated, the texture and the dark part may occur in the right region of the vertical stem part. Pixels having a pitch Lp of 5 µm or less may be used in small misalignment regions, but may not be suitable for in large misalignment regions.

FIG. 12A illustrates a pixel in which the width Lb of the fine branch part and the width Ls of the fine slit each are 3.6 µm and 2.4 µm. FIG. 12B illustrates a pixel in which the width Lb of the fine branch part and the width Ls of the fine slit each are 3 µm and 3 µm. FIG. 12C illustrates a pixel in which the width Lb of the fine branch part and the width Ls of the fine slit each are 2 µm and 4 µm. When pixels having the pitch Lp of 6 µm are in a large misalignment region, as illustrated, the larger the width Ls of the fine slit, the smaller the texture and the dark part which occur in the right region of the vertical stem part. That is, it may be appreciated that as the width Ls of the fine slit increases compare to the width Lb of the fine branch part, the control power of the liquid crystal is improved. When pixels having the pitch Lp of 6 µm are in a large misalignment region, the width Ls of the fine slit is 4 µm or greater may be used.

FIG. 13A illustrates a pixel in which the width Lb of the fine branch part and the width Ls of the fine slit each are 3.5 µm and 3.5 µm. FIG. 13B illustrates a pixel in which the width Lb of the fine branch part and the width Ls of the fine slit each are 2 µm and 5 µm. It may be appreciated that when pixels having the pitch Lp is 7 µm are in a large misalignment region, as illustrated, the texture and the dark part may not be as apparent as when the width Ls of the fine slit is 5 µm. It may be appreciated that when the pixel in which the pitch Lp is 7 µm and the width Ls of the fine slit is 5 µm is in the large misalignment region, deterioration in luminance and occurrence of texture due to the misalignment may be suppressed.

FIG. 14A illustrates a pixel in which the width Lb of the fine branch part and the width Ls of the fine slit each are 3.4 µm and 2.6 µm. FIG. 14B illustrates a pixel in which the width Lb of the fine branch part and the width Ls of the fine slit each are 2 µm and 4 µm. It may be appreciated that as the width Ls of the fine slit is formed to be wider than the width Lb of the fine branch part, the control power of the liquid crystal is improved. It may be appreciated that when the pixel having the same pitch Lp is disposed, the pixel in which the width Ls of the fine slit is large is to be used in the large misalignment region and the pixel in which the width Ls of the fine slit is small is to be used the small misalignment region.

By way of summation and review, one or more embodiments are directed to providing a curved liquid crystal display having advantages of improving a reduction in luminance due to misalignment in the curved liquid crystal display. According to an embodiment of the present invention, it is possible to suppress the deterioration in luminance and the occurrence of texture due to the misalignment of the upper and lower panels in the curved liquid crystal display.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A curved liquid crystal display, comprising:
   a plurality of first pixel in a first area, each first pixel including a first pixel electrode including a first crossed stem part, first fine branch parts extending from the first crossed stem part, and a first fine slit positioned between the first fine branch parts adjacent to each other; and
   a plurality of second pixel in a second area surrounding the first area, each second pixel including a second pixel electrode including a second crossed stem part, second fine branch parts extending from the second crossed stem part, and a second fine slit positioned between the second fine branch parts adjacent to each other, wherein:
   lengths and a number of the first fine branch parts of each first pixel are substantially equal to lengths and a number of the second fine branch parts of each second pixel such that each of the first fine branch parts of each first pixel corresponds to each of the second fine branch parts of each second pixel, and
   widths of the first fine branch parts of each first pixel are greater than widths of corresponding second fine branch parts of each second pixel.

2. The curved liquid crystal display as claimed in claim 1, wherein:
   the plurality of first pixels are positioned in the first area corresponding center areas on a left area and a right area of a screen, and the plurality of second pixels are positioned in the second area corresponding a peripheral area of the screen, the peripheral area surrounding the center areas.

3. The curved liquid crystal display as claimed in claim 2, wherein:
   a width of the first fine slit is larger than a width of the second fine slit.

4. The curved liquid crystal display as claimed in claim 1, wherein a first pitch, which is a sum of each of the widths of the first fine branch parts and a width of the first fine slit, is different from a second pitch, which is a sum of each of the widths of the second fine branch parts and a width of the second fine slit.

5. The curved liquid crystal display as claimed in claim 4, wherein:
   the first pitch is larger than the second pitch.

6. The curved liquid crystal display as claimed in claim 4, wherein:
   each of the first pitch and the second pitch is between 5 µm and 7 µm.

7. The curved liquid crystal display as claimed in claim 4, wherein:
   the first pitch is 7 µm.

8. The curved liquid crystal display as claimed in claim 1, wherein:
   a width of the first fine slit is larger than each of the widths of the first fine branch parts.

9. The curved liquid crystal display as claimed in claim 1, wherein:
a width of the second fine slit is larger than each of the widths of the second fine branch parts.

10. The curved liquid crystal display as claimed in claim 1, wherein:
each of a width of the first fine slit and a width of the second fine slit is equal to or more than 4 μm.

11. The curved liquid crystal display as claimed in claim 1, wherein:
each of the first pixel electrode and the second pixel electrode includes a first subpixel electrode and a second subpixel electrode, and
when a same data voltage is applied to the first subpixel electrode and the second subpixel electrode, the first subpixel electrode and the second subpixel electrode are charged to different voltages from each other.

12. The curved liquid crystal display as claimed in claim 1, wherein the first and second pixels are a same color pixel.

13. The curved liquid crystal display as claimed in claim 1, wherein the first and second pixels are in different areas of a screen including different misalignments between first and second panels.

14. The curved liquid crystal display as claimed in claim 1, further including a plurality of third pixels in a third area surrounding the first and second areas, each third pixel including a third pixel electrode including a third crossed stem part, third fine branch parts extending from the third crossed stem part, and a third fine slit positioned between the third fine branch parts adjacent to each other, wherein:

lengths and a number of the third fine branch parts of each third pixel are substantially equal to the lengths and the number of the first branch parts of each first pixel and the lengths and the number of the second fine branch parts of each second pixel such that each of the third fine branch parts of each third pixel corresponds to each of the first and second fine branch parts of each first pixel and each second pixel, and widths of the third fine branch parts of each third pixel are smaller than the widths of corresponding first and second fine branch parts of each first pixel and each second pixel.

* * * * *